(12) United States Patent
Stewart

(10) Patent No.: US 12,024,300 B2
(45) Date of Patent: Jul. 2, 2024

(54) METHOD AND SYSTEM FOR ICE DETECTION

(71) Applicant: Lockheed Martin Corporation, Bethesda, MD (US)

(72) Inventor: Jeffrey Stewart, Marietta, GA (US)

(73) Assignee: Lockheed Martin Corporation, Bethesda, MD (US)

(*) Notice: Subject to any disclaimer, the term of this patent is extended or adjusted under 35 U.S.C. 154(b) by 860 days.

(21) Appl. No.: 16/700,770

(22) Filed: Dec. 2, 2019

(65) Prior Publication Data
US 2024/0182176 A1    Jun. 6, 2024

(51) Int. Cl.
*B64D 15/20*    (2006.01)
*G01N 27/02*    (2006.01)

(52) U.S. Cl.
CPC ............ *B64D 15/20* (2013.01); *G01N 27/02* (2013.01)

(58) Field of Classification Search
CPC ................................ B64D 15/20; G01N 27/02
See application file for complete search history.

(56) References Cited

U.S. PATENT DOCUMENTS

| | | | |
|---|---|---|---|
| 4,766,369 A | 8/1988 | Weinstein | |
| 4,897,597 A * | 1/1990 | Whitener | G01W 1/14 340/580 |
| 5,191,791 A * | 3/1993 | Gerardi | G01M 5/0083 73/178 R |
| 5,206,806 A | 4/1993 | Gerardi et al. | |
| 5,208,095 A * | 5/1993 | Nietering | C03C 17/36 359/359 |
| 5,398,547 A * | 3/1995 | Gerardi | G08B 19/02 340/580 |
| 5,474,261 A * | 12/1995 | Stolarczyk | B64D 15/20 244/134 F |
| 5,521,584 A * | 5/1996 | Ortolano | B64D 15/20 340/581 |
| 5,523,959 A * | 6/1996 | Seegmiller | B64D 15/20 702/170 |
| 5,569,850 A * | 10/1996 | Rauckhorst, III | G01N 29/09 29/610.1 |
| 5,686,841 A * | 11/1997 | Stolarczyk | G01R 23/07 324/633 |
| 5,754,167 A * | 5/1998 | Narusawa | G05G 9/047 345/161 |
| 5,760,711 A * | 6/1998 | Burns | B64D 15/20 340/583 |
| 5,772,153 A * | 6/1998 | Abaunza | B64D 15/20 73/861.04 |
| 5,861,756 A * | 1/1999 | Yankielun | G01N 27/221 340/580 |
| 5,874,672 A * | 2/1999 | Gerardi | G08B 19/02 340/580 |
| 5,955,887 A * | 9/1999 | Codner | G01N 27/041 324/687 |

(Continued)

*Primary Examiner* — Quan Zhen Wang
*Assistant Examiner* — Son M Tang
(74) *Attorney, Agent, or Firm* — Baker Botts L.L.P.

(57) ABSTRACT

A system including an apparatus for determining the presence of ice on an external surface of a structure is provided. The apparatus includes a sensor that includes first and second parallel ink or paint conductive traces separated by a gap. The apparatus also includes a circuit configured to measure the impedance or change in impedance between the first and second parallel ink or paint conductive traces.

15 Claims, 3 Drawing Sheets

(56) References Cited

U.S. PATENT DOCUMENTS

| | | | | |
|---|---|---|---|---|
| 5,998,791 | A * | 12/1999 | Matsumora | G01J 5/34 338/18 |
| 6,010,095 | A * | 1/2000 | Hackmeister | B64D 15/20 244/134 F |
| 6,237,874 | B1 * | 5/2001 | Rutherford | B64D 15/14 244/134 R |
| 6,329,913 | B1 * | 12/2001 | Shieh | B60R 21/01532 340/561 |
| 6,384,611 | B1 * | 5/2002 | Wallace | B64D 15/20 324/699 |
| 6,608,489 | B2 * | 8/2003 | Yankielun | B64D 15/20 324/533 |
| 6,731,225 | B2 * | 5/2004 | Vopat | B64D 15/20 340/580 |
| 6,870,139 | B2 | 3/2005 | Petrenko | |
| 6,879,168 | B2 * | 4/2005 | Baas | G01N 27/226 324/662 |
| 6,884,706 | B2 * | 4/2005 | Forbes | H01L 23/53209 257/E21.656 |
| 6,995,572 | B2 * | 2/2006 | Arndt | G08B 19/02 324/639 |
| 7,000,871 | B2 * | 2/2006 | Barre | B64D 15/20 340/580 |
| 7,026,943 | B2 * | 4/2006 | Knowles | B64D 15/20 73/659 |
| 7,104,502 | B2 | 9/2006 | Otto et al. | |
| 7,439,877 | B1 * | 10/2008 | Jarvinen | B64D 15/20 340/581 |
| 7,523,889 | B2 * | 4/2009 | Bourjac | B64D 15/22 244/134 R |
| 7,602,049 | B2 * | 10/2009 | Forbes | H01L 23/5225 257/664 |
| 7,629,558 | B2 | 12/2009 | Petrenko | |
| 7,775,482 | B2 * | 8/2010 | Gordon | B64D 15/22 340/580 |
| 8,292,230 | B2 | 10/2012 | DeSmet | |
| 9,201,031 | B2 | 12/2015 | Lilie et al. | |
| 9,302,777 | B2 * | 4/2016 | Rennó | B64D 15/20 |
| 9,612,163 | B2 | 4/2017 | Meis et al. | |
| 9,625,248 | B2 * | 4/2017 | Figueroa-Karlström | G01B 7/06 |
| 9,678,029 | B2 * | 6/2017 | Rateick | B64D 45/00 |
| 10,066,923 | B2 * | 9/2018 | Go | G01B 7/082 |
| 10,640,217 | B2 * | 5/2020 | Botura | F02C 7/04 |
| 10,718,730 | B2 * | 7/2020 | Ashida | G01N 27/221 |
| 11,021,259 | B1 * | 6/2021 | Jarvinen | B64D 33/04 |
| 11,169,042 | B1 * | 11/2021 | Riou | G01L 19/0654 |
| 11,477,888 | B2 * | 10/2022 | Nino | H05K 1/16 |
| 2012/0020188 | A1 * | 1/2012 | Mielenz | G01S 7/52004 367/99 |
| 2012/0222948 | A1 * | 9/2012 | Lin | H03K 17/962 200/600 |
| 2012/0310191 | A1 * | 12/2012 | LaVon | G01N 33/4875 604/361 |
| 2014/0167500 | A1 * | 6/2014 | Frankenberger | B64F 5/40 29/846 |
| 2014/0180630 | A1 * | 6/2014 | Cheatham, III | H02J 50/40 307/11 |
| 2015/0338363 | A1 * | 11/2015 | Dean, Jr. | G01N 27/221 324/663 |
| 2017/0033454 | A1 * | 2/2017 | van Bezooijen | H01Q 1/50 |
| 2018/0355194 | A1 * | 12/2018 | Yadavalli | H01G 11/36 |
| 2019/0092346 | A1 * | 3/2019 | Odate | B60W 10/20 |
| 2019/0290501 | A1 * | 9/2019 | LaVon | A61F 13/51401 |
| 2020/0113054 | A1 * | 4/2020 | Nino | H05K 1/16 |
| 2021/0163055 | A1 * | 6/2021 | Midorikawa | G01L 5/221 |
| 2022/0111182 | A1 * | 4/2022 | Patil | A61M 25/09041 |

\* cited by examiner

METHOD AND SYSTEM FOR ICE DETECTION

TECHNICAL FIELD

This disclosure relates in general to ice detection sensors for aircraft and more particularly to ice detection sensors for low-observable aircraft.

BACKGROUND

Aircraft icing can occur under certain atmospheric conditions. The icing primarily forms on the leading edge of the wings. Such ice accretion, if allowed to build up, can cause a loss of lift, which can, in extreme cases, cause the aircraft to crash. Thus, modern commercial aircraft incorporated anti-icing devices. For example, large aircraft incorporate hot air ducts along the leading edges of wings. Hot air bleeding from the compressor stages of the turbine engines are fed through these ducts, melting the ice. Smaller aircraft use inflatable boots that can be pulsed to expand and contract, breaking up the ice. Other systems involve the use of electromechanical actuators that flex the outer skin of the wings, breaking up the ice. On most small aircraft, de-icing systems are not employed. Therefore, the pilot is required to fly the aircraft out of the "ice forming" environment. All aircraft having de-icing systems must have ice formation sensors strategically placed to sense the ice forming so that the de-icing system can be actuated in a timely manner.

Even on aircraft that do not have de-icing systems, detection systems are often incorporated. The most obvious method is visual examination by the flight crew. While the pilot can usually see the wings on small general aviation aircraft, on larger aircraft the wings are not always visible from the flight station. At night, visual examination may not be possible. Thus, an ice detection system will give the pilot warning and allow him or her to fly the aircraft out of the area. If the aircraft is unmanned, the remote operator will have the same capability.

There are numerous types of ice detection systems available, for example, U.S. Pat. No. 6,052,056 "Substance Detection System." In this system, a modulated light source is directed to an optical sensor located in an area where ice will tend to accumulate, such as an aerodynamic surface or engine inlet. The sensor transmits light back to a detector that is proportional to the amount of ice on the surface.

Another approach is to use capacitance probes mounted on the external surface. Examples of these can be found in U.S. Pat. No. 4,766,369 "Ice Detector System"; U.S. Pat. No. 45,569,850 "Ice Detector"; and U.S. Pat. No. 5,854,672 "Apparatus and Method for Determining the Existence of Ice or Water on a Surface from the Capacitance Between Electrodes on Said Surface." In these devices, capacitance probes, generally spaced conductive electrodes encapsulated in a non-conductive substrate, are mounted on a surface where ice will tend to accumulate. The accumulating ice, of course, will change the capacitance of the probe, which can be sensed by a capacitance measuring circuit.

Yet another approach is found in U.S. Pat. No. 6,879,168 (the "'168 Patent"). Under this approach, a system for determining the presence of ice comprises a guard layer, a non-conductive layer mounted on top of the guard layer, electrodes mounted on top of the non-conductive layer, and leads attached to the electrodes. To detect the presence of ice, the impedance in the region near the electrodes is measured.

SUMMARY OF THE DISCLOSURE

According to one embodiment, an apparatus for determining the presence of ice on an external surface of a structure is provided. The apparatus includes a sensor that includes first and second parallel ink or paint conductive traces separated by a gap. The apparatus also includes a circuit configured to measure the impedance between the first and second parallel ink or paint conductive traces.

According to another embodiment, a method of applying a sensor for determining the presence of ice on an external surface of a structure includes forming, on a base structure, a sensor, by spraying or rolling first and second conductive traces of phenolic-based paint or ink having a gap disposed therebetween. The method also includes electrically coupling the first and second conductive traces of phenolic-based paint or ink to a circuit configured to measure the impedance in the gap between the first and second conductive traces.

Technical advantages of certain embodiments may include the ability to apply an ice detection sensor directly to a surface of complex curvature while maintaining a low radar signature. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

The teachings of the disclosure recognize that a problem with existing capacitance probe type ice detection systems is that they do not lend themselves to use on low radar observable aircraft. The lead wires to the probes and the probes themselves tend to increase the radar signature on the aircraft. The conductive probes and lead wires scatter the incoming radar signals and have radar cross-sections that are much too large for low-observable ("LO") aircraft applications. Accordingly, conductive probe detection systems cannot be used with LO aircraft. Further, capacitance probe detection systems are unable to decouple the capacitive component of impedance from the resistive component, leading to inferior detection sensitivity and reliability.

Further, the teachings of the disclosure recognize, that although desirable in some instances, several problems exist with the system described above with respect to the '168 Patent. First, the system consists of inflexible, physical components and cannot be applied to a surface of complex curvature. The system cannot, for example, be painted or sprayed onto an outer surface of an aircraft, particularly a low-observable aircraft. The system also cannot be applied on leading edges of an aircraft wing with small radii. The leading edge of the aircraft wing is typically where the ice forms first. Second, the system must use an intermediate, non-conductive layer when applied to any type of aircraft surface, whether the aircraft surface is metallic or non-metallic. Third, the entire system must be placed on the exterior of the aircraft, causing an increased radar cross-section and decreased utility for LO applications.

The teachings of the disclosure recognize that by using conductive paint or ink to form conductive traces as part of an ice sensor, these above problems can be addressed. Such conductive paint or ink allows painting or spraying of the conductive trace forming the ice sensor onto the aircraft surface, which allows formation of the sensor onto surfaces with complex curvatures while maintaining low observability. The following describes systems and methods of ice detection for providing these and other desired features.

Figure 1:
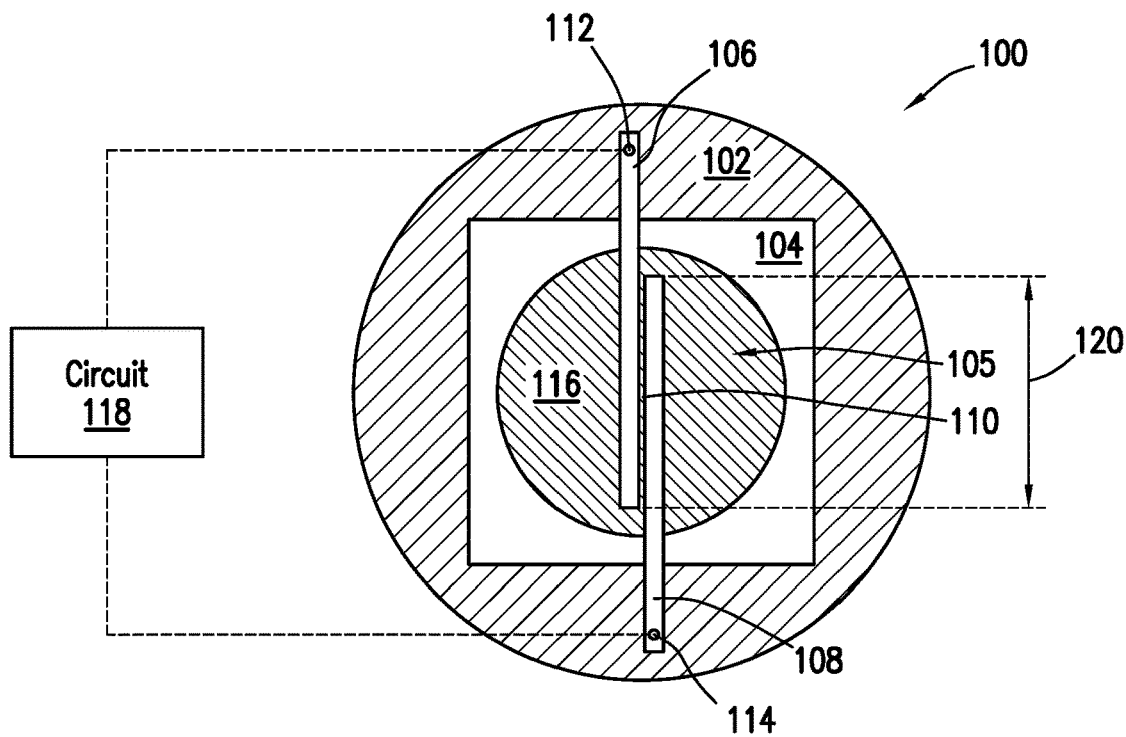
FIG. 1 illustrates an ice detection system, according to certain embodiments.

FIG. 1 illustrates an ice detection system 100 according to one embodiment. As shown in FIG. 1, ice detection system 100 may include, in some embodiment, a base structure 102, a dielectric layer 104, and a sensor 105 including first and second conductive traces 106 and 108 separated by a gap 110. Connection points 112 and 114 may be formed on conductive traces 106 and 108, respectively. A dielectric coating 116 may be formed on conductive traces 106 and 108. The ice detection system 100 also includes a circuit 118 associated with the first and second conductive traces 106 and 108.

In general, the impedance caused by the gap 110 between first and second conductive traces 106 and 108 changes with ice accumulation in gap 110. Thus, by measuring the impedance between conductive traces 106 and 108, ice accumulation can be detected. Formation of first and second conductive traces 106 and 108 from paint or ink allows the conductive traces to be painted or sprayed onto a structure, in accordance with various methods described herein. This provides, in some embodiments, several advantages, such as the ability to implement an effective ice detection system, including on structures of complex curvature, while maintaining low observability.

Base structure 102 is a layer onto which ice sensor 105 is formed. Such layer may be a layer of an aircraft, a removeable layer that may be attached to an aircraft, or other suitable layer. Base structure 102 may comprise a metallic or non-metallic material and may be either conductive or non-conductive. Such base structure 102 may be either a bare base structure or a coating applied to a bare base structure. Base structure 102 may further be a flat or curved surface. In another embodiment, base structure 102 comprises a metallic structure. The metallic structure may short out the capacitance generated by first and second conductive traces 106 and 108. As a result, a dielectric layer 104 may be positioned between the base structure and the first and second conductive traces 106 and 108, in order to generate a capacitance in the gap 110. In some embodiments, base structure 102 may be coated with a material specifically for use on low-observable ("LO") aircraft. The specific configuration of the sensor 105, and necessity of dielectric layer 104, depends on the specific type of LO coating that is present.

Dielectric layer 104 may comprise any dielectric material, including but not limited to ceramics, paper, mica, polyethylene, glass, and metal oxides. Dielectric layer 104 provides separation between the base structure 102 and first and second conductive traces 106 and 108, allowing for a capacitance to be generated in gap 110. Dielectric layer 104 may vary in thickness depending on the specific application. Where dielectric layer 104 is used, it should be thick enough to mitigate the unwanted capacitive coupling between base structure 102 and conductive traces 106 and 108.

Conductive traces 106 and 108 may comprise conductive paint or ink that is applied to the contour of the base structure 102. Conductive traces 106 and 108 may further comprise a type of phenolic-based paint, in some embodiments. The conductivity of the paint or ink can be tailored for various applications and can range from less than 1 ohm per square to 5,000 ohms per square. Conductive traces 106 and 108 may be applied directly to the base structure 102 through various methods. These methods include spraying and rolling the conductive traces onto the base structure 102. In some embodiments, the conductive traces may be painted onto the base structure 102, including by using a silk screen. Conductive paint may be either sprayed or rolled onto a surface, in some embodiments. Conductive ink may be pre-treated or cured such that it may be sprayed onto a surface. Conductive paint or ink may also be applied to the surface using a silk screen. The amount and particular method of applying the conductive paint or ink to base structure 102 depends on the specific application and desired conductivity. Solvents and conductive loading materials may also be added to the conductive paint or ink prior to application on base structure 102. Conductive traces 106 and 108 may be applied to a base structure 102 of any curvature and can be indexed relative to the geometry of the base structure such that the gap 110 is aligned with areas of maximum ice formation. In some embodiments, conductive traces 106 and 108 may be arranged parallel to each other. In these embodiments, the parallel arrangement allows for conductive traces 106 and 108 to be offset, or vertically overlapped, by a vertical distance 120. Vertical distance 120 may be a range of values. For example, a desirable vertical distance 120 may be any distance greater than or equal to 1 inch, and a particularly desirable vertical distance 120 may be any distance greater than 3 inches. In one embodiment, the edges of conductive traces 106 and 108 may be tapered, such that conductive traces 106 and 108 only have sharp edges directly surrounding gap 110. By tapering the conductive traces, the sensor 105 is made even less visible to a radar. In some embodiments, the parallel arrangement of conductive traces 106 and 108 allows for the formation of a gap 110. The gap 110 may be any range of widths, including widths between 0.01 and 0.03 inches. The gap 110 generates an impedance that can be measured to determine if ice is present on base structure 102. The impedance can be modeled as having a resistive component and a capacitive component.

The presence of ice on base structure 102 may be detected through various approaches. In one embodiment, ice is detected by measuring the impedance of the gap 110. In this embodiment, a baseline impedance is set, indicating the absence of ice on base structure 102, and ice is detected when the impedance exceeds the baseline level. In another embodiment, ice is detected by measuring the change of the impedance of gap 110. In this embodiment, the gap 110 generates a baseline impedance which can be used to establish a benchmark for detecting the presence of ice on base structure 102. When ice accumulates in gap 110, the impedance of the gap changes, i.e., the capacitance increases, and the resistance decreases. Either the increase in capacitance or decrease in resistance may be used to indicate the presence of ice on base structure 102. When water is present without ice, there is a minimal effect on the capacitance, but the resistance decreases. This effect can be used to discriminate between water and ice on base structure 102.

Connection points 112 and 114 allow for instrumentation to be connected to the sensor 105 that will measure the impedance (or change in impedance) of the gap 110. Such instrumentation may include wires, cables, and circuitry allowing the sensor to send a signal to an administrator upon detection of ice on base structure 102. Connection points 112 and 114 may be surface connections on the exterior of base structure 102 or sub-surface connections on the interior of base structure 102. Where sub-surface connections are used, instrumentation may be connected to conductive traces from inside the base structure 102. In some embodiments, a plurality of fasteners (not explicitly shown) may be used to penetrate base structure 102 and enable an electrical connection to sensor 105 from inside the base structure, such as by attaching internal instrumentation such as wires to the fasteners. The fasteners may be any type of fastener capable of penetrating a structure, including screws and bolts.

In some embodiments, conductive traces 106 and 108 may be covered by a dielectric coating 116. Dielectric coating 116 may comprise an erosion coating and may be applied to the conductive traces 106 and 108 by spraying, painting, and various other techniques.

In certain embodiments, system 100 may be detachable from an aircraft. Such detachment can be accomplished through the use of fasteners such as screws and bolts. System 100 may also be applied to an aircraft through an external, protruding structure, similar to a blade antenna, with the leads of the sensor applied to the leading edge of the external, protruding structure.

In certain embodiments, various circuit configurations may be used with respect to circuit 118. Additional details of exemplary circuits are described in conjunction with FIGS. 3-4.

In operation, sensor 105 may be implemented on an aircraft using various techniques described herein. For example, conductive traces 106 and 108, comprising phenolic-base ink or paint, may be directly sprayed onto the skin of a wing of an aircraft. Conductive traces 106 and 108 may be electrically coupled to a circuit 118 configured to measure the impedance (or change in impedance) detected in gap 110 between conductive traces 106 and 108. Conductive traces 106 and 108 may be electrically connected to circuit 118 that detects an electrical property indicative of ice formation in gap 110, such as impedance or change in impedance. Such electrical connection may be effected using instrumentation in the interior of the aircraft wing or instrumentation extending to the exterior of the aircraft wing. Conductive traces 106 and 108 may further be coated with a dielectric material such as an erosion coating.

Figure 2A:
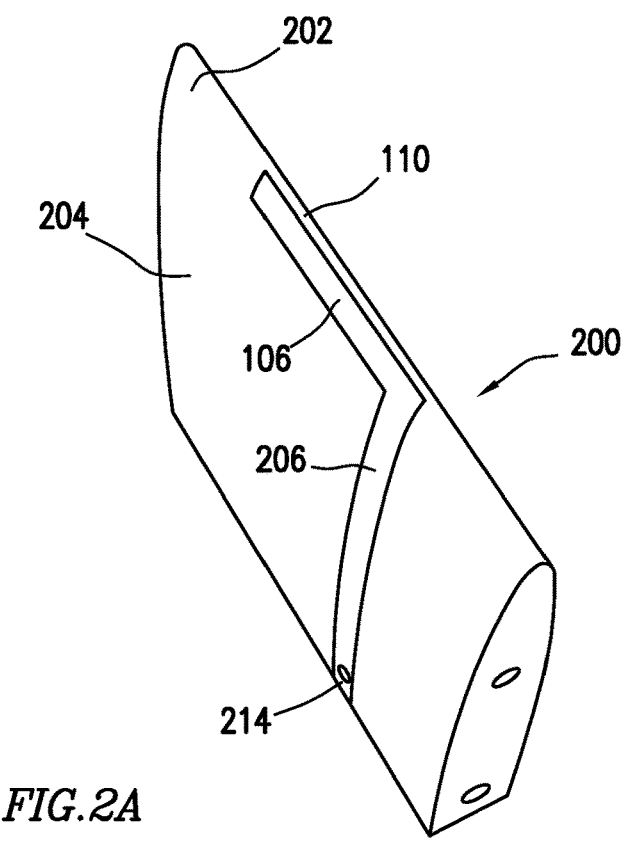
FIG. 2A illustrates a leading-edge portion of a wing of an aircraft having the ice detection system of FIG. 1, according to certain embodiments.
Figure 2B:
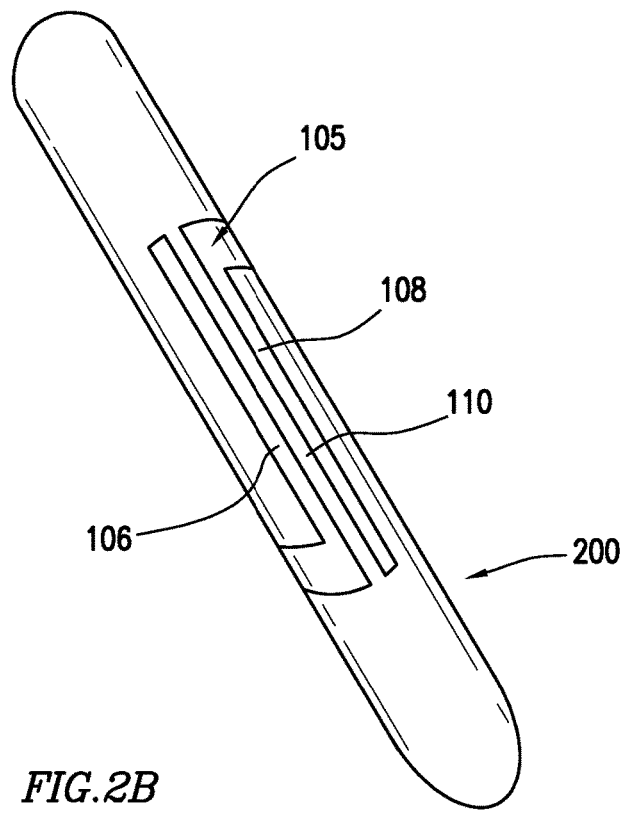
FIG. 2B illustrates the leading-edge of FIG. 2A with the leading-edge rotated to better illustrate the gap between the conductive traces of the ice detection system.

FIG. 2A illustrates a leading-edge portion of a wing 200 of an aircraft having the ice detection system 100 of FIG. 1, according to certain embodiments. FIG. 2B illustrates the leading-edge of FIG. 2A with the leading-edge rotated to better illustrated the gap between the conductive traces of the ice detection system.

The leading-edge portion 202 includes an outer skin 204. The outer skin 204 may be comprised of metallic or non-metallic material. Conductive trace 106 is shown along the leading-edge of the wing. Gap 110 is depicted between conductive trace 106 and the other side of the wing 200 not shown in FIG. 2A but shown in FIG. 2B. A sensor lead 206 runs perpendicular to conductive trace 106 and intersects with conductive trace 106. Connection point 214 is depicted in a different position than connection point 114 of FIG. 1. Sensor lead 206 may, however, be positioned and applied at any angle with respect to conductive trace 106. Conductive trace 108 is illustrated in FIG. 2B, as is gap 110 pictured between traces 106 and 108 therebetween. In the illustrations of FIGS. 2A and 2B, neither dielectric layer 104 nor dielectric coating 116 are illustrated for clarity of illustration.

Figure 3:
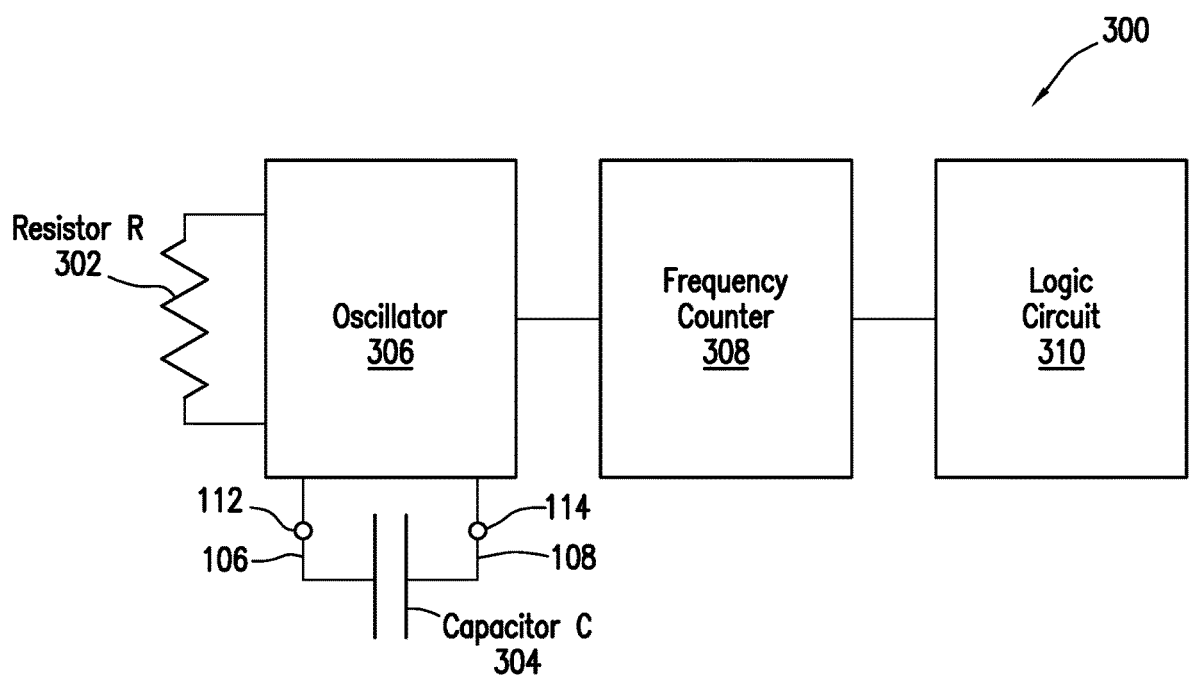
FIG. 3 illustrates a block diagram of a circuit for measuring the change in impedance detected by the ice detection sensor of FIG. 1, according to certain embodiments.

FIG. 3 illustrates a block diagram of a circuit 300 for measuring the change in impedance detected by the ice detection sensor of FIG. 1, according to certain embodiments. Circuit 300 may include in some embodiments a resistor 302, a capacitor 304 representing the capacitance of gap 110, an oscillator 306, a frequency counter 308, and a logic circuit 310. In an embodiment, circuit 300 may be used to measure the change in impedance in the gap 110 compared to a reference impedance.

In this embodiment, oscillator 306 generates a signal with a frequency based on a resistance R and the sensor capacitance C. Resistance R can be used to adjust the frequency. Circuit 300 may be electrically coupled to conductive traces 106 and 108 at connection points 112 and 114, respectively, at capacitor 304. Circuit 300 may be configured to measure the change in impedance of gap 110 at a frequency of measurement, in this embodiment. Desirable operating frequencies are between 1 kHz and 100 kHz, and particularly desirable operating frequencies are between 4 kHz and 6 kHz. Typical values for the sensor capacitance are between 5 pF and 10 pF. Frequency counter 308 measures the number of oscillations in a given time period. The logic circuit 310 compares the number of oscillations against a reference value for a no-ice condition. When ice is present, capacitance C will increase, and the frequency will decrease. The logic circuit detects this decrease in frequency and outputs an "ice detected" signal.

Figure 4:
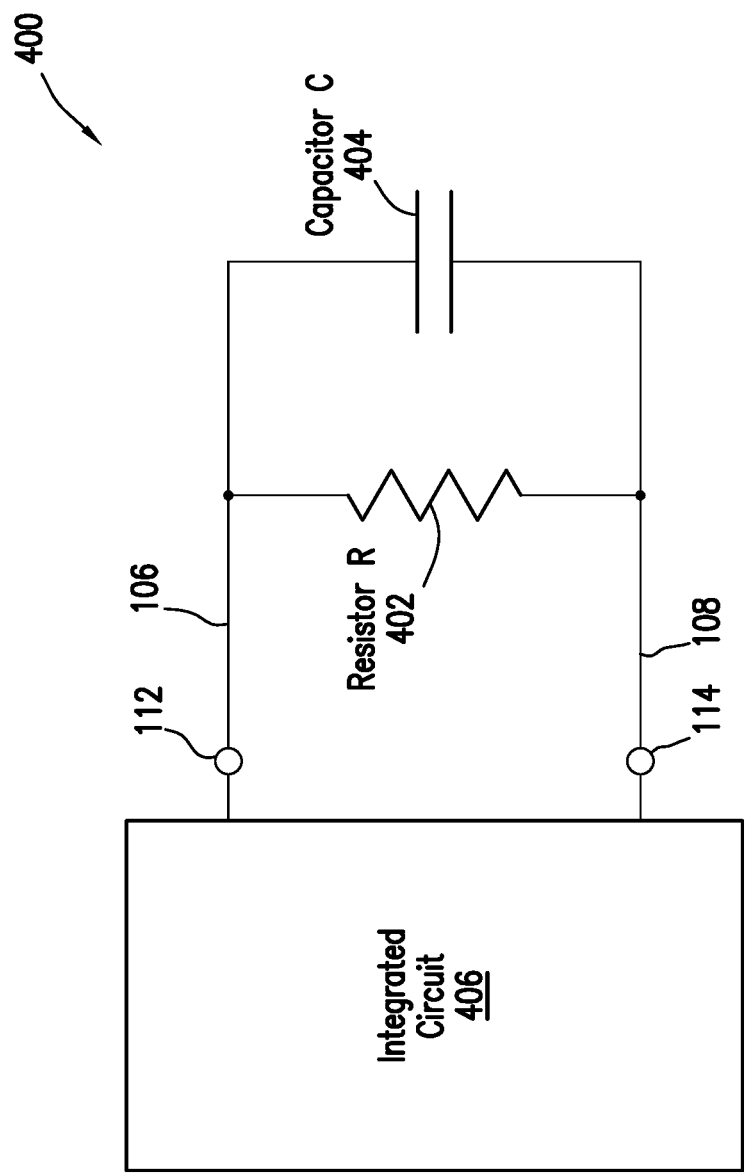
FIG. 4 illustrates a block diagram of another circuit for measuring the impedance detected by an ice detection sensor, according to certain embodiments.

FIG. 4 illustrates a block diagram of another circuit 400 for measuring the impedance detected by an ice detection sensor, according to certain embodiments. Circuit 400 includes a resistor 402, a capacitor 404, and an integrated circuit (IC) 406. Numerous commercial off-the-shelf integrated circuits are available to measure impedance. In an embodiment, circuit 400 may be used to measure the impedance of the gap 110 and compare that value to a reference impedance. Conductive traces 106 and 108 may be connected to the IC 406 at connection points 112 and 114, respectively, and the IC 406 may be configured to measure the sensor impedance in terms of parallel capacitance and parallel resistance. The presence of ice is indicated when the parallel capacitance rises above a reference value for a no-ice condition. The parallel resistance of the sensor 105 can be used to discriminate wet and dry conditions. When water is present without ice, only the parallel resistance decreases significantly, indicating the presence of water but not ice. Circuit 400 may be electrically coupled to conductive traces 106 and 108 at IC 406. Circuit 400 may further be configured to receive a signal from the system 100 and measure the impedance in the gap 110 between conductive traces 106 and 108.

A number of implementations have been described. Nevertheless, it will be understood that various modifications may be made without departing from the spirit and scope of the invention. Elements of different implementations described herein may be combined to form other implementations not specifically set forth above. Elements may be left out of the processes, structures, and systems described herein without adversely affecting their operation. Furthermore, various separate elements may be combined into one or more individual elements to perform the functions described herein. While certain example embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for determining the presence of ice on an external surface of a structure, the apparatus comprising:
    a base structure;
    a sensor affixed to the base structure, the sensor comprising:
        first and second conductive traces each defined by a shape having edges and separated by a gap, wherein the first and second conductive traces are applied directly to the base structure such that a dielectric layer is not positioned between the base structure and the first and second conductive traces, the first and second conductive traces comprising parallel phenolic-based ink conductive traces or paint conductive traces, wherein the edges of the first and second conductive traces are tapered such that the first and second conductive traces have sharp edges only directly surrounding the gap;
    a circuit configured to measure impedance between the first and second conductive traces wherein the impedance has a capacitive component and a resistive component and the capacitive component is decoupled from the resistive component, and the circuit is further configured to distinguish between ice and water on the external surface of the base structure based on the capacitive component and the resistive component of the impedance; and
    a coating of dielectric material covering the first and second conductive traces.

2. The apparatus of claim 1, further comprising a plurality of fasteners penetrating the base structure and enabling an electrical connection to the sensor from inside the base structure.

3. The apparatus of claim 1, wherein the gap between the first and second conductive traces is between 0.01 and 0.03 inches wide.

4. The apparatus of claim 1, wherein the first and second conductive traces overlap vertically by at least 1 inch.

5. The apparatus of claim 1, wherein the circuit is configured to measure the impedance at a frequency of measurement between 1 kHz and 100 kHz.

6. The apparatus of claim 1, wherein the apparatus is detachable from an aircraft.

7. An apparatus for determining the presence of ice on an external surface of a structure, the apparatus comprising:
    a base structure;
    a sensor comprising:
        first and second conductive traces each defined by a shape having edges and separated by a gap, wherein the first and second conductive traces are applied directly to the base structure such that a dielectric layer is not positioned between the base structure and the first and second conductive traces, the first and second conductive traces comprising parallel ink conductive traces or paint conductive traces, wherein the edges of the first and second conductive traces are tapered such that the first and second conductive traces have sharp edges only directly surrounding the gap; and
    a circuit configured to measure impedance between the first and second conductive traces wherein the impedance has a capacitive component and a resistive component and the capacitive component is decoupled from the resistive component, and the circuit is further configured to distinguish between ice and water on the external surface of the base structure based on the capacitive component and the resistive component of the impedance.

8. The apparatus of claim 7, wherein the gap between the first and second conductive traces is between 0.01 and 0.03 inches wide.

9. The apparatus of claim 7, wherein the first and second conductive traces overlap vertically by at least 1 inch.

10. The apparatus of claim 7, wherein the circuit is configured to measure the impedance at a frequency of measurement between 1 kHz and 100 kHz.

11. The apparatus of claim 7, wherein the apparatus is detachable from an aircraft.

12. A method of applying a sensor for determining the presence of ice on an external surface of a structure, comprising:
    forming a sensor on a base structure by spraying or rolling first and second conductive traces directly on the base structure, wherein the first and second conductive traces comprise phenolic-based paint or ink, each defined by a shape with edges and having a gap disposed therebetween, wherein the edges of the first and second conductive traces are tapered such that the first and second conductive traces have sharp edges only directly surrounding the gap; and
    electrically coupling the first and second conductive traces of phenolic-based paint or ink to a circuit configured to measure impedance in the gap between the first and second conductive traces wherein the impedance has a capacitive component and a resistive component and the capacitive component is decoupled from the resistive component, and the circuit is further configured to distinguish between ice and water on the external surface of the base structure based on the capacitive component and the resistive component of the impedance.

13. The method of claim 12, wherein forming the sensor on the base structure comprises forming the sensor on an exterior of an aircraft.

14. The method of claim 12, wherein forming the sensor comprises using a silk screen to apply the sensor to the base structure.

15. The method of claim 12, further comprising covering the first and second conductive traces with a coating of dielectric material.

* * * * *